(No Model.)

J. M. KLEIN.
WIRE CLAMP.

No. 588,446. Patented Aug. 17, 1897.

Witnesses:
Fred Gerlach
Oliver C. Dennis

Inventor
John M. Klein
By Prince & Fisher
Attorneys

UNITED STATES PATENT OFFICE.

JOHN M. KLEIN, OF CHICAGO, ILLINOIS.

WIRE-CLAMP.

SPECIFICATION forming part of Letters Patent No. 588,446, dated August 17, 1897.

Application filed June 7, 1897. Serial No. 639,638. (No model.)

*To all whom it may concern:*

Be it known that I, JOHN M. KLEIN, a resident of Chicago, in the county of Cook and State of Illinois, have invented certain new and useful Improvements in Wire Clamps or Stretchers, of which I do declare the following to be a full, clear, and exact description, reference being had to the accompanying drawings, forming a part of this specification.
This invention has relation more particularly to that class of wire clamps or stretchers designed more especially in stringing telegraph, telephone, barbed wires, or the like, an example of this type of stretcher being shown in Patent No. 481,179, granted to me August 23, 1892.

The present invention has for its object to provide a simple, cheap, durable, and effective construction of wire clamp or stretcher; and with this object in view the invention consists in the novel features of construction hereinafter described, illustrated in the accompanying drawings, and particularly pointed out in claims at the end of this specification.

Figure 1:
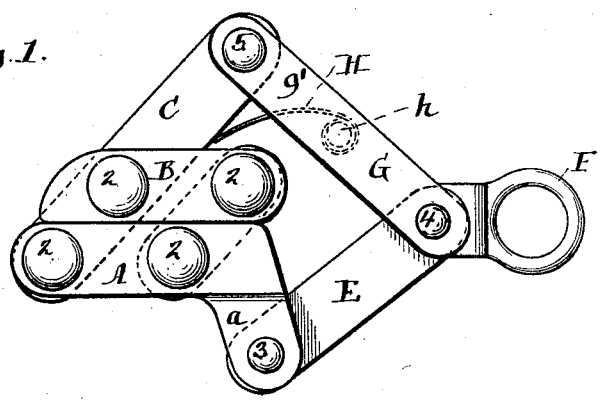
Figure 2:
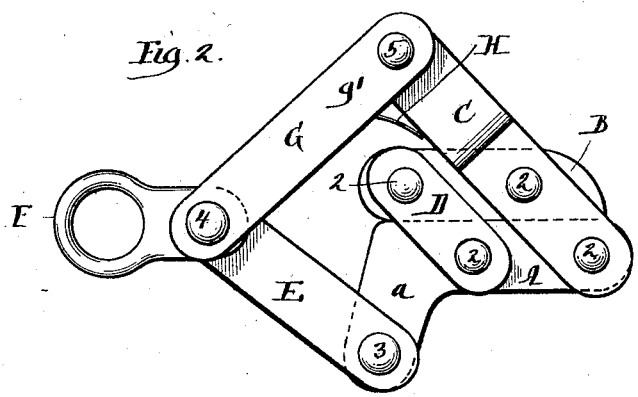
Figure 3:
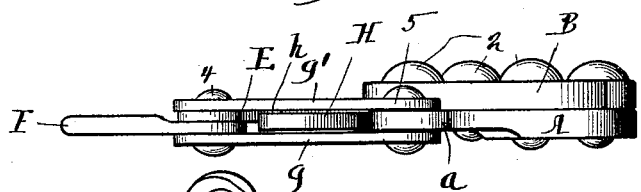
Figure 4:
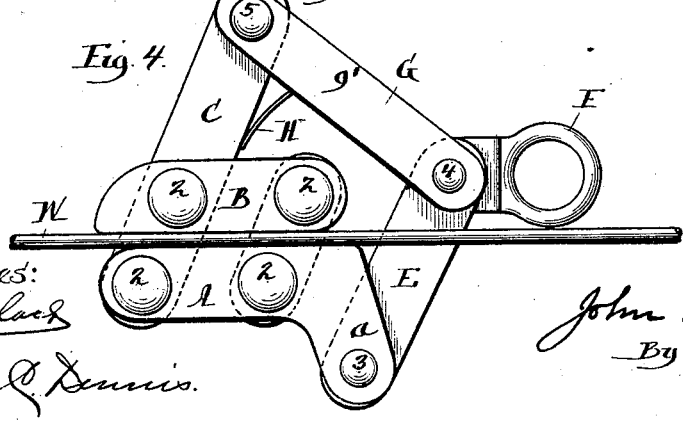

Figure 1 is a view in side elevation of a wire-clamp embodying my invention. Fig. 2 is a side view of the clamp from the side opposite that shown in Fig. 1. Fig. 3 is a plan view. Fig. 4 is a view in side elevation similar to Fig. 1, but showing the position of the parts when the jaws are open.

A and B designate the jaws of the clamp, these jaws being connected by the bar C and link D, that are pivoted to the jaws by suitably-headed bolts or rivets 2. The opposing edges of the jaws A and B may be straight or slightly grooved longitudinally, these opposing edges serving to securely engage the wire W when placed between the jaws. The jaw A is shown as formed with an angular extension $a$, to which is pivotally connected by a bolt 3 the link E, the opposite end of this link being perforated to receive the pivot-bolt 4, that passes through the link E and through a hole in the draft-loop F, to which the tackle-block will be connected, and as well also through the ends of the duplex link G, that is preferably formed of the separate bars $g\ g'$, as clearly seen in Fig. 3. The opposite ends of the duplex bars $g\ g'$, that comprise the link G, are perforated to receive the pivot-bolt 5, whereby the link G is pivotally connected to the end of the bar C.

When a wire is to be engaged by the clamp, the links E and G will be pressed toward the jaws A and B, as seen in Fig. 4 of the drawings, thereby causing the jaws A and B to separate. Preferably a spring H, having one end fixed to and coiled about a stud $h$, that extends between the sections $g\ g'$ of the link G, has its free end extended beneath the link or bar C, and this spring tends to force the jaws A and B normally toward each other and upon the wire between the jaws. When strain is exerted upon the draft-loop F, the links E and G will act as toggles to cause the jaws A and B to firmly clamp the wire, so that all danger of its slipping from the jaws is avoided. In this class of devices it is important that the constructions shall be such that the wire should be firmly held by the jaws of the clamp, and it is important also that the length of the clamp shall be short in order to enable the tackle that is attached to the loop or eye F to engage the wire as near as possible.

In my present invention by the employment of the toggle-links I am enabled to get a very firm and rigid grasp upon the wire, and the length of the clamp is so reduced that there is but very little distance between the wire and the tackle-loop F, as but a slight movement of the toggle-links serves to open the jaws.

I do not wish that my invention should be understood as restricted to the precise details of construction above described. Thus, for example, it is not essential that the link G should be formed of separate plates, although this is regarded as preferable.

Having thus described my invention, what I claim as new, and desire to secure by Letters Patent, is—

1. A wire clamp or stretcher comprising two jaws, a bar pivotally connecting said jaws and having an extended end, a toggle-link pivoted to the extended end of said bar, and another toggle-link pivotally connected at one end to one of the jaws and at its opposite end pivotally connected to said first-mentioned toggle-link, substantially as described.

2. A wire clamp or stretcher comprising two jaws, a link and a bar pivotally connected to said jaws, a toggle-link connected to said bar, another toggle-link connected to one of the jaws and a draft-loop connected to the opposite ends of said toggle-links, substantially as described.

3. A wire clamp or stretcher comprising jaws A and B, the jaw A being provided with an angular extension $a$, said jaws being pivotally linked together, a bar C pivoted to said jaws and toggle-links connected at one end to a draft-hook and connected at their opposite ends respectively to the angular extension of the jaw A and to the bar C, substantially as described.

JOHN M. KLEIN.

Witnesses:
ALBERTA ADAMICK,
OLIVER C. DENNIS.